United States Patent Office 3,128,269
Patented Apr. 7, 1964

3,128,269
3-AMINOMETHYLENE ANDROSTANES
Albert Bowers and John Edwards, Mexico City, Mexico, and John Zderic, Palo Alto, Calif., assignors, by mesne assignments, to Syntex Corporation, a corporation of Panama
No Drawing. Filed Aug. 1, 1961, Ser. No. 128,363
17 Claims. (Cl. 260—239.5)

The present invention relates to novel cyclopentanophenanthrene compounds and to process for the production thereof.

More particularly the present invention relates to 3-amino-methylene-androstant-17β-ol-2-one derivatives.

The novel compounds of the present invention which are potent anabolic-androgenic agents with a particularly favorable anabolic-androgenic ratio, possess anti-estrogenic, anti-gonadotropic, and blood cholesterol lowering activities, depress the action of the pituitary gland and exhibit anti-fibrillatory action, are represented by the following formula:

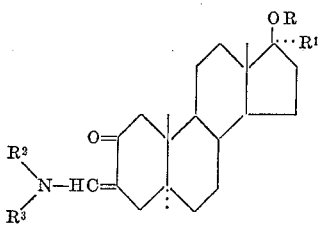

In the above formula, R represents hydrogen or a hydrocarbon carboxylic acyl group containing less than 12 carbon atoms; $R^1$ may be hydrogen or an alkyl, alkenyl or alkynyl group of up to 8 carbon atoms; $R^2$ and $R^3$ represent hydrogen, lower alkyl, di(lower alkyl) amino lower alkyl, or an aryl or aralkyl group containing up to 8 carbon atoms; and $R^2$ and $R^3$ together with the nitrogen atom form a heterocycle as for example piperidine, morpholine or pyrrolidine.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino, or halogen. Typical ester groups are the acetate, propionate, enanthate, benzoate, trimethylacetate, t-butylacetate, phenoxyacetate, cyclopentylpropionate, aminoacetate and β-chloropropionate.

The compounds of the present invention are prepared by the process illustrated by the following equation:

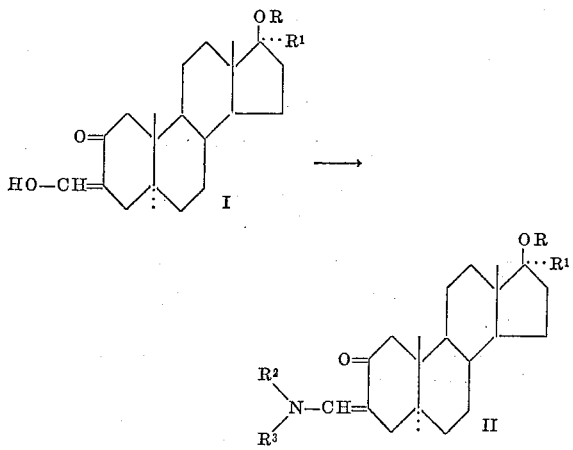

In the above formulas, R, $R^1$, $R^2$ and $R^3$ have the same meaning as previously set forth.

In practicing the process above outlined, the starting 3-hydroxymethylene-androstant-17β - ol - 2-one derivative (I) obtained by reacting Δ²-androstene-17β-ol-3-one with a N-haloamide, oxidizing the thus formed halohydrin, dehalogenating to form the corresponding 2-keto-17β-hydroxy-androstan which, alternatively, is reacted with ethyl formate to afford the 2-keto-3-hydroxymethylene-androstane-17β-ol derivative or is first protected at C-2 by formation of a ketal, oxidized to form the 17-keto moiety which is then conventionally transformed into the 17α-aliphatic hydrocarbon-17β-hydroxy grouping, and further reacted with ethyl formate to introduce the 3-hydroxymethylene group as described in the copending U.S. patent application Serial No. 128,362 filed of even date, is treated with ammonia or an amine such as a di(lower alkyl)amine, for instance, diethylamine in a suitable solvent, for example dioxane, for a period of time of the order of 72 hours to give the corresponding 3-aminomethylene derivative (II).

When the amine used has a higher boiling point, as for example, piperidine, N-methyl aniline or diethyl-aminoethylamine, the starting compound (I) is refluxed with the respective amine in a suitable solvent such as dioxane for a period of time of the order of 24 hours to give the corresponding 3-aminomethylene derivative (II).

The following specific Examples serve to illustrate but are not intended to limit the scope of the present invention:

Example I

A solution of 1 g. of 3-hydroxymethylene-androstan-17β-ol-2-one in 75 cc. of dioxane was saturated with ammonia and the reaction mixture kept for 72 hours at room temperature. Water was then added and the resulting precipitate filtered off, washed with water and dried. Recrystallization from methanol-benzene afforded 3-aminomethylene-androstan-17β-ol-2-one.

Following the above procedure there were treated 3-hydroxymethylene-17α-methyl-androstan-17β-ol-2-one, 3-hydroxymethylene-17α-vinyl-androstan-17β-ol-2-one, and 3 - hydroxymethylene-17α-ethinyl-androstan-17β-ol-2-one, affording respectively 3-aminomethylene-17α-methyl-androstan-17β-ol-2-one, 3-aminomethylene - 17α - vinyl-androstan-17-β-ol-2-one, and 3-aminomethylene-17α-ethinyl-androstan-17β-ol-one.

Example II

The compounds 3-hydroxymethylene-17α-methyl-androstan-17β-ol-2-one-17-acetate, 3-hydroxymethylene-17α-vinyl-androstan-17β-ol-2-one-17-acetate, and 3-hydroxymethylene-17α-ethinyl-androstan - 17β-ol-2-one-17-acetate are treated in the same manner as described in Example I, thus furnishing correspondingly 3-aminomethylene-17α-methyl-androstan - 17β - ol-2-one-17-acetate, 3 - aminomethylene - 17α-vinyl-androstan-17β-ol-2-one-17-acetate, and 3-aminomethylene - 17α - ethynyl-androstan-17β-ol-2-one-17-acetate.

Example III

Following the procedure described in Example I except that ammonia was substituted by diethylamine, there were treated 3-hydroxymethylene-androstan-17β-ol-2-one, 3-hydroxymethylene-17α-methyl-androstan-17β-ol-2-one, 3-hydroxymethylene-17α-vinyl-androstan-17β-ol-2-one, 3 - hydroxymethylene-17α-ethinyl-androstan-17β-ol-2-one, giving respectively 3-N,N,-diethylaminomethylene-androstan-17β-ol-2-one, 3-N,N-diethylaminomethylene-17α-methyl-androstan-17β-ol-2-one, 3 -N,N-diethyl-aminomethylene-17α-vinyl-androstan-17β-ol-2-one, and 3 - N,N-diethyl-aminomethylene-17α-ethinyl-androstan-17β-ol-2-one.

Example IV

When applying the method of Example III to 3-hydroxymethylene-17α-methyl-androstan-17β-ol-2-one-17-propionate, 3-hydroxymethylene-17α-vinyl-androstan-17β-ol-2-one-17-propionate, and 3-hydroxymethylene-17α-ethinyl-androstan-17β-ol-2-one-17-propionate, there were correspondingly obtained 3-N,N-diethylaminomethylene-17α-methyl-androstan-17β-ol-2-one-17-propionate, 3-N,N-diethylaminomethylene-17α-vinyl-androstan-17β-ol-2-one-17-propionate, and 3-N,N-diethylaminomethylene-17α-ethinyl-androstan-17β-ol-2-one-17-propionate.

Example V 1 g. of 3-hydroxymethylene-androstan-17β-ol-2-one in 30 cc. of dioxane was refluxed with 2 g. of piperidine for 24 hours. The greater part of the solvents was removed by evaporation under reduced pressure. Water was then added, the formed precipitate was filtered off, washed and dried. Recrystallization from acetone-hexane afforded 3-piperidino-methylene-androstan-17β-ol-2-one.

Following exactly the same procedure, there were treated 3-hydroxymethylene-17α-methyl-androstan-17β-ol-2-one, 3-hydroxymethylene-17α-vinyl-androstan-17β-ol-2-one, and 3-hydroxymethylene-17α-ethinyl-androstan-17β-ol-2-one, affording correspondingly 3-piperidino-methylene-17α-methyl-androstan-17β-ol-2-one, 3-piperidino-methylene-17α-vinyl-androstan-17β-ol-2-one, and 3-piperidino-methylene-17α-ethinyl-androstan-17β-ol-2-one.

Example VI

Using the same conditions described in Example V, except that piperidine was substituted by morpholine, there were treated 3-hydroxymethylene-androstan-17β-ol-2-one, 3-hydroxymethylene-17α-methyl-androstan-17β-ol-2-one-17-caproate, 3-hydroxymethylene-17α-vinyl-androstan-17β-ol-2-one-17-caproate, and 3-hydroxymethylene-17α-ethinyl-androstan-17β-ol-2-one-17-caproate, affording correspondingly 3-morpholino-methylene-androstan-17β-ol-2-one, 3-morpholino-methylene-17α-methyl-androstan-17β-ol-2-one-17-caproate, 3-morpholino-methylene-17α-vinyl-androstan-17β-ol-2-one-17-caproate, and 3-morpholino-methylene-17α-ethinyl-androstan-17β-ol-2-one-17-caproate.

Example VII

Following the technique described in Example V except that piperidine was substituted by pyrrolidine, there were treated 3-hydroxymethylene-androstan-17β-ol-2-one, 3-hydroxymethylene-17α-methyl-androstan-17β-ol-2-one-17-cyclopentylpropionate, 3-hydroxymethylene-17α-vinyl-androstan-17β-ol-2-one-17-cyclopentylpropionate, and 3-hydroxymethylene-17α-ethinyl-androstan-17β-ol-2-one-17-cyclopentylpropionate, affording correspondingly 3-pyrrolidino-methylene-androstan-17β-ol-2-one, 3-pyrrolidino-methylene-17α-methyl-androstan-17β-ol-2-one-17-cyclopentylpropionate, 3-pyrrolidino-methylene-17α-vinyl-androstan-17β-ol-2-one-17-cyclopentylpropionate, and 3-pyrrolidinomethylene-17α-ethynyl-androstan-17β-ol-2-one-17-cyclopentylpropionate.

Example VIII

In accordance with Example V, except that piperidine was substituted by N-methyl aniline, there were treated 3-hydroxymethylene-androstan-17β-ol-2-one, 3-hydroxymethylene-17α-methylandrostan-17β-ol-2-one, 3-hydroxymethylene-17α-vinyl-androstan-17β-ol-2-one, and 3-hydroxymethylene-17α-ethinyl-androstan-17β-ol-2-one affording correspondingly 3-N-methyl-N-phenylaminomethylene-androstan-17β-ol-2-one, 3-N-methyl-N-phenylaminomethylene-17α-methyl-androstan-17β-ol-2-one, 3-N-methyl-N-phenyl-aminomethylene-17α-vinyl-androstan-17β-ol-2-one, and 3-N-methyl-N-phenyl-aminomethylene-17α-ethinylandrostan-17β-ol-2-one.

Example IX

Following the procedure described in Example V, but substituting piperidine by diethylaminoethylamine, there were treated 3-hydroxymethylene-androstan-17β-ol-2-one, 3-hydroxymethylene-17α-methyl-androstan-17β-ol-2-one, 3-hydroxymethylene-17α-vinyl-androstan-17β-ol-2-one, 3-hydroxymethylene-17α-ethinyl-androstan-17β-ol-2-one, affording respectively 3-N-(N',N'-diethylaminoethyl)-aminomethylene-androstan-17β-ol-2-one, 3-N-(N',N'-diethylaminoethyl)-aminomethylene-17α-methyl-androstan-17β-ol-2-one, 3-N-(N',N'-diethylaminoethyl)-aminomethylene-17α-vinyl-androstan-17β-ol-2-one, and 3-N-(N',N'-diethylamino-ethyl)-aminomethylene-17α-ethinyl-androstan-17β-ol-2-one.

We claim:

1. A compound of the following formula:

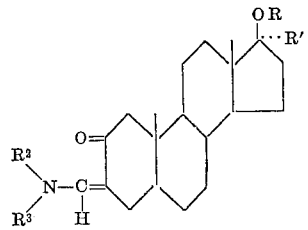

wherein R is selected from the group consisting of hydrogen and a hydrocarbon carboxylic acyl group of less than 12 carbon atoms; $R^1$ is a member of the group consisting of hydrogen, an alkyl group, an alkenyl group and an alkynyl group each containing up to 8 carbon atoms; $R^2$ and $R^3$ are selected from the group consisting of hydrogen, lower alkyl, di(lower alkyl)amino lower alkyl, an aryl group and an aralkyl group each containing up to 8 carbon atoms; and $R^2$ and $R^3$ together with the nitrogen atom form a heterocyclic radical selected from the group consisting of piperidino, morpholino and pyrrolidino.

2. 3-aminomethylene-androstan-17β-ol-2-one.
3. 3-aminomethylene-17α-methyl-androstan-17β-ol-2-one-17-acetate.
4. 3-aminomethylene-17α-vinyl-androstan-17β-ol-2-one-17-acetate.
5. 3-aminomethylene-17α-ethinyl-androstan-17β-ol-2-one-17-acetate.
6. 3-N,N-diethylaminomethylene-androstan-17β-ol-2-one.
7. 3-N,N-diethylaminomethylene-17α-methyl-androstan-17β-ol-2-one-17-propionate.
8. 3-piperidino-methylene-androstan-17β-ol-2-one.
9. 3-piperidinomethylene-17α-vinyl-androstan-17β-ol-2-one.
10. 3-morpholino-methylene-androstan-17β-ol-2-one.
11. 3-morpholino-methylene-17α-ethinyl-androstan-17β-ol-2-one-17-caproate.
12. 3-pyrrolidino-methylene-androstan-17β-ol-2-one.
13. 3-pyrrolidino-methylene-17α-methyl-androstan-17β-ol-2-one-17-cyclopentylpropionate.
14. 3-N-methyl-N-phenyl-aminomethylene-androstan-17β-ol-2-one.
15. 3-N-methyl-N-phenyl-aminomethylene-17α-vinyl-androstan-17β-ol-2-one.
16. 3-N-(N',N'-diethylaminoethyl)-aminomethylene-androstan-17β-ol-2-one.
17. 3-N-(N',N'-diethylaminoethyl)-aminomethylene-17α-ethinyl-androstan-17β-ol-2-one.

References Cited in the file of this patent

De Stevens et al.: J. Org. Chem., vol. 26 (May 1961), pp. 1614–1617.

Ketcheson et al.: Canadian Jour. of Chemistry, vol. 38 (1960), pp. 972–979.

Disclaimer

3,128,269.—*Albert Bowers* and *John Edwards*, Mexico City, Mexico, and *John Zderic*, Palo Alto, Calif. 3-AMINOMETHYLENE ANDROSTANES. Patent dated Apr. 7, 1964. Disclaimer filed Jan. 24, 1966, by the inventors; the assignee, *Syntex Corporation*, assenting.
Hereby enter this disclaimer to claims 1 and 6 of said patent.
[*Official Gazette May 24, 1966.*]